US008524114B2

(12) United States Patent
Bewsey

(10) Patent No.: US 8,524,114 B2
(45) Date of Patent: Sep. 3, 2013

(54) NITRATES

(75) Inventor: John Arthur Bewsey, Cape Town (ZA)

(73) Assignees: John Arthur Bewsey, Cape Town (ZA); Alastair James Forsyth, Roodekrans (ZA)

(*) Notice: Subject to any disclaimer, the term of this patent is extended or adjusted under 35 U.S.C. 154(b) by 392 days.

(21) Appl. No.: 11/989,466

(22) PCT Filed: Jul. 27, 2006

(86) PCT No.: PCT/IB2006/002045
§ 371 (c)(1),
(2), (4) Date: Feb. 18, 2009

(87) PCT Pub. No.: WO2007/012951
PCT Pub. Date: Feb. 1, 2007

(65) Prior Publication Data
US 2009/0189117 A1 Jul. 30, 2009

(30) Foreign Application Priority Data

Jul. 27, 2005 (ZA) .................................. 2005/06011
Apr. 7, 2006 (ZA) .................................. 2006/02845

(51) Int. Cl.
*C09K 3/00* (2006.01)
*C01B 21/50* (2006.01)
*C01F 5/38* (2006.01)
*C01F 11/36* (2006.01)

(52) U.S. Cl.
USPC ........................... 252/182.23; 423/395; 71/54

(58) Field of Classification Search
USPC .................. 423/395, 155, 385, 169, 1, 658.5; 252/182.34
See application file for complete search history.

(56) References Cited

U.S. PATENT DOCUMENTS

| | | | | |
|---|---|---|---|---|
| 1,776,694 | A * | 9/1930 | Luscher | 423/395 |
| 1,893,946 | A * | 1/1933 | Kaselitz | 423/395 |
| 1,916,617 | A * | 7/1933 | Jaenecke et al. | 71/29 |
| 2,949,370 | A * | 8/1960 | Hughes | 426/128 |
| 3,030,179 | A * | 4/1962 | McFarlin et al. | 423/265 |
| 4,294,813 | A * | 10/1981 | Gaidis et al. | 423/385 |
| 4,742,601 | A * | 5/1988 | Furutsu | 24/30.5 R |
| 7,097,818 | B2 * | 8/2006 | Lindner et al. | 423/326 |

FOREIGN PATENT DOCUMENTS

| | | |
|---|---|---|
| EP | 0 696 551 A1 | 2/1996 |
| EP | 0 789 014 A1 | 8/1997 |
| EP | 1 541 525 A1 | 6/2005 |
| EP | 1 561 508 A1 | 8/2005 |
| FR | 764.440 | 5/1934 |
| FR | 764 440 A | 5/1934 |
| GB | 678404 * | 9/1952 |

OTHER PUBLICATIONS

Sigma, Biochemical and Reagents, Sigma-Aldrich, 2002-2003, p. 366, p. 1299.*
Hawley's Condensed Chemical Dictionary (15th Edition), (2007), (pp. 83).*
"Anhydrous", definition accessed from http://www.merriam-webster.com/dictionary/anhydrous on Oct. 14, 2011.*
Lakota, Vladimir et al: "Powdered calcium nitrate" XP002409973 retrieved from STN, Database accession No. 81:2857 abstract & CS 151 689 B Nov. 19, 1973.
Tominaga, Shosuke et al: "Drying of waste calcium nitrate solutions"; XP002409974, retrieved from STN, Database accession No. 89:91815; abstract & JP 53 025266 A2 (Kawasaki Heavy Industries Ltd., Japan) Mar. 8, 1978.
Anonymous: "Pulse technology FAQ"; Internet Citation, [Online], Feb. 2, 2001, XP002212801, Retrieved from the Internet: URL:http://web.archive.org/web/20010202193400/pulsedry.com/faq.html; retrieved on Sep. 5, 2002, whole document.
Lakota, Vladimir et al., "Powdered calcium nitrate," STN, Database Accession No. 81:2857 (1984).
Pulse Combustion Systems, "Pulse Technology FAQ," retrieved online at: URL:http://web.archive.org/web/20010202193400/pulsedry.com/faq.html (2000).
Tominaga, Shosuke et al., "Drying of waste calcium nitrate solutions," STN, Database Accession No. 89:91815 (1984).
International Search Report for Application No. PCT/IB2006/002045, dated Dec. 27, 2006.

* cited by examiner

*Primary Examiner* — Peter F Godenschwager
(74) *Attorney, Agent, or Firm* — Nelson Mullins Riley & Scarborough LLP; Anthony A. Laurentano, Esq.

(57) ABSTRACT

A method of producing anhydrous calcium nitrate, anhydrous magnesium nitrate or mixture thereof involves removing water from a solution of calcium nitrate, magnesium nitrate or mixture thereof in a pulse combustion drier. The invention also provides a mixture of anhydrous calcium nitrate, anhydrous magnesium nitrate and the individual anhydrous nitrate salts in a sealed container.

18 Claims, No Drawings

NITRATES

RELATED APPLICATIONS

This application is a 35 U.S.C. 371 national stage filing of International Application No. PCT/IB2006/002045 filed 27 Jul. 2006, which claims priority to South African Patent Application Nos. 2005/06011 filed on 27 Jul. 2005 and 2006/02845 filed on 7 Apr. 2006 in South Africa. The contents of the aforementioned applications are hereby incorporated by reference.

BACKGROUND OF THE INVENTION

This invention relates to nitrates.

Calcium and magnesium nitrates are used extensively in industry and agriculture. The commercially available products both contain water of crystallization. Calcium nitrate contains about 30 percent water of crystallization and magnesium nitrate about 39 percent water of crystallization The presence of this water leads to problems in storage of the product and causes problems when used in blends with each other and with other materials.

At present calcium nitrate crystals are made commercially with the addition of about 6 percent ammonium nitrate to form a double salt which contains 15 percent water of crystallization. The double salt crystals are formed on a cooling belt and crushed or formed into a prill in a prilling tower.

The formation of magnesium nitrate heptahydrate crystals or prills is a lesser problem because of the higher melting point of magnesium nitrate.

A blend of calcium and magnesium nitrates is a useful product in agriculture, but is difficult to manufacture because of the difficulty in crystallizing the mixture. To date there is no known commercial method of making such a blend or mixture.

SUMMARY OF THE INVENTION

According to the present invention, a method of producing anhydrous calcium nitrate, anhydrous magnesium nitrate or a mixture thereof, includes the steps of providing a solution of calcium nitrate, magnesium nitrate or a mixture thereof, and removing water therefrom in a pulse combustion drier. The solution will typically contain at least 40%, and generally at least 75%, by mass of dissolved calcium nitrate, magnesium nitrate or mixture thereof.

Further according to the invention, a product useful in industry or agriculture comprises at least one kilogram of anhydrous calcium nitrate, anhydrous magnesium nitrate or a mixture thereof in a container such as a bag.

Still further according to the invention, there is provided a mixture of anhydrous calcium nitrate and anhydrous magnesium nitrate. The components of the mixture will typically be present in a mass ratio of calcium nitrate to magnesium nitrate in the range 6:1 to 2:1. Particularly useful mixtures are ones containing a calcium nitrate:magnesium nitrate mass ratio of 4:1 or 2:1. The mixture is preferably homogeneous, i.e. in any milligram sample of the mixture the mass ratio calcium nitrate to magnesium nitrate will be essentially the same. A further preferred feature of the mixture is that it has a solution rate in water faster than commercially available calcium nitrate which contains ammonium nitrate and water of crystallization and generally comes in the form of a prill. The mixture will preferably be substantially ammonia free and free flowing.

DESCRIPTION OF EMBODIMENTS

The product produced by the method of the invention is anhydrous calcium nitrate, anhydrous magnesium salt or a mixture thereof. This means that the nitrate salt or mixture will contain as low a water of crystallization content as possible and preferably be substantially free of water of crystallization. Generally, the water of crystallization content of the nitrate salt or mixture of nitrate salts will be less than 10% by mass, preferably less than 5% by mass and more preferably less than 2% by mass.

The mixture of nitrate salts will preferably be homogenous, as defined above, substantially free of ammonia and free flowing.

The invention has particular application to a mixture or blend of anhydrous magnesium and calcium nitrates. The water of crystallisation content of such a mixture will be less than 10% by mass and preferably less than 5% by mass and more preferably less than 2% by mass. The mixture can readily be produced in powder form and packaged in a container such as a bag. If the container is essentially air-tight, then the mixture can be kept for long periods of time without caking or solidification occurring. The water content of prior art calcium and magnesium nitrate s gives rise to caking and solidification problems both in pure products, mixtures and in blends of other salts such as hydroponic blends containing potassium nitrate, phosphate salts, ammonium nitrate or urea.

The anhydrous nitrates or mixture thereof are produced in a pulse combustion drier. Examples of pulse combustion driers are described In U.S. Pat. Nos. 3,618,655, 4,226,668, 4,708,159, 4,819,873, 4,838,784, 4,941,820 and 4,992,039. Pulse combustion driers are used for drying materials such a fishmeal where rapid heat is required to avoid denaturing of proteins in the material and in drying high value products such as those produced in the pharmaceutical industry. To the best of the applicants knowledge, pulse combustion driers have never been used to dry bulk chemicals, particularly those in the agricultural industry.

In the present invention, sound pressures and heat are generated in a combustion chamber or zone in a pulse combustion drier and used to dry the nitrate solution. The sound pressures and heat generated in the combustion chamber are generally passed into a drying chamber or zone where the solution to be treated is sprayed into the path of the sound pressures and heat Sound pressures as high as 180 dBA and temperatures of about 110 to 130° C. are produced in the drying chamber. Typical nitrate solutions that are introduced into the drying chamber are those having a nitrate salt concentration of at least 40%, for example a nitrate salt concentration of about 50%. The contact time of the solution to be dried in the drying chamber is measured in microseconds, as sound pressures disperse the solution into droplets which are dried by the heat and air. The fine anhydrous nitrate powder produced collects on a surface of the drying chamber, which is preferably a cooled surface, and may be recovered therefrom. The energy efficiency of this method is very good and approaches the theoretical maximum for an exit temperature of 100° C. (about 80%).

The fine powder may be packed directly into essentially air-tight bags or steam agglomerated, or agglomerated in a standard pan agglomerates or and then packed.

Thus, the method of the present invention provides a way of producing anhydrous magnesium nitrate or anhydrous calcium nitrate, and more particularly a mixture thereof, that is commercially viable, labour free and provides a product that does not easily cake and form solid masses in a container such as a bag over time.

An example of the invention will now be given. A pulse combustion drier was used to remove water from a solution of calcium nitrate and magnesium nitrate which contained 40 mass percent of dissolved solids, i.e. nitrates. The unit size of the drier was 0.1 gJ/hr and the operating conditions were:

| | |
|---|---|
| Operating heat production | 0.05 gJ/hr |
| Product feed rate | 25 kg/hr |
| Feed concentration | 40% solids |
| Product rate | 10 kg/hr |
| Product analysis | Ca 19.5% Mg - 4.8%: N - 16.5%: Moisture-0.6% |
| Pulse rate | 11/sec |
| Contact temperature | 563 deg C. |
| Exit temperature | 105 deg C. |

A fine powder was collected on the lower surfaces of the drying chamber. This powder was a homogeneous mixture of anhydrous calcium nitrate and anhydrous magnesium nitrate. Each nitrate particle contained less than 2 mass % water of crystallization. The mass ratio of anhydrous calcium nitrate to anhydrous magnesium nitrate was 4:1. The mixture had an excellent solution rate in water and much faster than commercially available calcium nitrate prills. The mixture was substantially ammonia free and free flowing and was stored in a water and air-tight container and remained anhydrous, substantially ammonia free and free flowing for many months.

The invention claimed is:

1. A method of producing a mixture consisting of anhydrous calcium nitrate and anhydrous magnesium nitrate, comprising the steps of providing a solution of calcium nitrate and magnesium nitrate, and removing water therefrom in a pulse combustion drier, wherein a water of crystallization content of the mixture produced is less than 10% by mass.

2. A method according to claim 1 wherein the solution contains at least 40% by mass of nitrate salt.

3. A method according to claim 1 wherein the solution contains at least 75% by mass of nitrate salt.

4. A method according to claim 1 wherein the water of crystallization content of the mixture produced is less than 5% by mass.

5. A method according to claim 1 wherein the water of crystallization content of the mixture produced is less than 2% by mass.

6. A method according to claim 1 wherein the mass ratio of the anhydrous calcium nitrate to the anhydrous magnesium nitrate in the mixture is in the range 6:1 to 2:1.

7. A method according to claim 1 wherein the mass ratio of anhydrous calcium nitrate to anhydrous magnesium nitrate in the mixture is in the range 4:1 to 2:1.

8. A method according to claim 1 wherein the mixture of anhydrous calcium nitrate and anhydrous magnesium nitrate is homogeneous.

9. A mixture consisting of anhydrous calcium nitrate and anhydrous magnesium nitrate, wherein a water of crystallization content of the mixture is less than 10% by mass.

10. A mixture according to claim 9 wherein a water of crystallization content of the mixture is less than 5% by mass.

11. A mixture according to claim 9 wherein a water of crystallization content of the mixture is less than 2% by mass.

12. A mixture according to claim 9 wherein a mass ratio of the anhydrous calcium nitrate to the anhydrous magnesium nitrate in the mixture is in the range 6:1 to 2:1.

13. A mixture according to claim 9 wherein a mass ratio of anhydrous calcium nitrate to anhydrous magnesium nitrate in the mixture is in the range 4:1 to 2:1.

14. A mixture according to claim 9 which is a homogeneous mixture of the nitrates.

15. A kit, comprising a mixture according to claim 9 disposed in a sealed and air-tight container.

16. A product, consisting of a mixture of at least one kilogram of anhydrous calcium nitrate and anhydrous magnesium nitrate in a container, wherein a water of crystallization content of the mixture is less than 10% by mass.

17. A product according to claim 16 wherein the container is a water and air-tight container.

18. A product according to claim 16 wherein the container is a bag.

* * * * *